(12) United States Patent
Shah et al.

(10) Patent No.: US 10,331,178 B2
(45) Date of Patent: Jun. 25, 2019

(54) RIGIDLY BONDED TRACKPAD WITH STRUCTURAL STIFFENER

(71) Applicant: Microsoft Technology Licensing, LLC, Redmond, WA (US)

(72) Inventors: Ketan R. Shah, Redmond, WA (US); Todd David Pleake, Sammamish, WA (US); Benjamin Joseph Carpenter, Redmond, WA (US); George Karavaev, Redmond, WA (US); Mark Gerard Rice, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/669,480

(22) Filed: Aug. 4, 2017

(65) Prior Publication Data
US 2019/0041903 A1 Feb. 7, 2019

(51) Int. Cl.
*G06F 1/16* (2006.01)
*G06F 3/0354* (2013.01)

(52) U.S. Cl.
CPC ............ *G06F 1/169* (2013.01); *G06F 1/1656* (2013.01); *G06F 1/1662* (2013.01); *G06F 3/03547* (2013.01)

(58) Field of Classification Search
CPC .................... G06F 1/1692; G06F 3/03547
See application file for complete search history.

(56) References Cited

U.S. PATENT DOCUMENTS

| | | | |
|---|---|---|---|
| 8,188,981 B2 | 5/2012 | Shahoian et al. | |
| 9,030,839 B2 | 5/2015 | Leggett et al. | |
| 9,041,663 B2 | 5/2015 | Westerman | |
| 9,471,169 B2 | 10/2016 | Schediwy et al. | |
| 9,477,328 B2 | 10/2016 | Clayton et al. | |
| 9,535,557 B2 | 1/2017 | Bernstein et al. | |
| 9,591,764 B2 | 3/2017 | Reynolds et al. | |
| 2005/0057525 A1* | 3/2005 | Sun ..................... | G06F 1/1616 345/173 |
| 2006/0274055 A1* | 12/2006 | Reynolds ............ | G06F 3/03547 345/174 |
| 2014/0092034 A1* | 4/2014 | Franklin ............. | G09F 13/0413 345/173 |
| 2015/0185779 A1 | 7/2015 | Doi et al. | |

OTHER PUBLICATIONS

Bohn, Dieter, "The MacBook Pro's new Force Touch Trackpad is great", https://www.theverge.com/2015/3/13/8210599/macbook-pro-new-force-touch-trackpad-hands-on-video, Published on: Mar. 13, 2015, 5 pages.

* cited by examiner

*Primary Examiner* — Adrian S Wilson
(74) *Attorney, Agent, or Firm* — Holzer Patel Drennan (57) ABSTRACT

The trackpad assemblies described herein maintain minimum overall stiffness, weight, and cost requirements of a trackpad assembly, while permitting a decrease in trackpad assembly thickness as compared to conventional trackpad assemblies. The trackpad assemblies may include one or more of a four-layer PCB, structural adhesives, a structural PCB stiffener, and a structural shield assembly. These stiffening features permit increasingly thinner trackpad assemblies and associated computing devices.

22 Claims, 6 Drawing Sheets

RIGIDLY BONDED TRACKPAD WITH STRUCTURAL STIFFENER

BACKGROUND

A trackpad (or touchpad) is a pointing device for user input on a computing device. Trackpads incorporate a touch-sensitive surface (or a tactile sensor) that can translate position and motion of a user's fingers in contact with (or close proximity to) the touch-sensitive surface to a relative position and motion on a display, which is also connected to the computing device.

As computing devices shrink in physical size and weight and become more portable, trackpads associated with the computing devices also shrink in physical size and weight. However, user expectations demand that trackpad size and performance remain substantially the same or be improved.

As the thickness of a trackpad assembly is reduced, all else being equal, overall stiffness of the assembly is also reduced. Mechanisms to maintain minimum overall stiffness, weight, and cost requirements of a trackpad assembly, while permitting a decrease in trackpad assembly thickness permit increasingly thinner trackpad assemblies, and as a result, increasingly thinner computing devices.

SUMMARY

Implementations described and claimed herein provide a trackpad comprising a printed circuit board, a user interface layer bonded to a first side of the printed circuit board with a structural adhesive therebetween, and a structural stiffener bonded to a second side of the printed circuit board with another structural adhesive therebetween.

Implementations described and claimed herein further provide a method of manufacturing a trackpad comprising rigidly bonding a user interface layer to a first side of a printed circuit board using a structural adhesive and rigidly bonding a structural stiffener to a second side of the printed circuit board using another structural adhesive.

Implementations described and claimed herein further still provide a computing device comprising a chassis and a trackpad. The trackpad includes a printed circuit board, a user interface layer bonded to a first side of the printed circuit board with a structural adhesive therebetween, a structural stiffener bonded to a second side of the printed circuit board with another structural adhesive therebetween, and a trackpad switch. The chassis includes a trackpad height set screw pressing against the trackpad switch to set a resting height of the trackpad with reference to a top surface of the computing device and a resilient stop oriented between the set screw and the chassis to absorb one or both of contact of the set screw with the chassis and reverberations therebetween.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

The trackpad assemblies described herein maintain minimum overall stiffness, weight, and cost requirements of a trackpad assembly, while permitting a decrease in trackpad assembly thickness as compared to conventional trackpad assemblies. This permits increasingly thinner trackpad assemblies, and as a result, associated computing devices.

Figure 1:
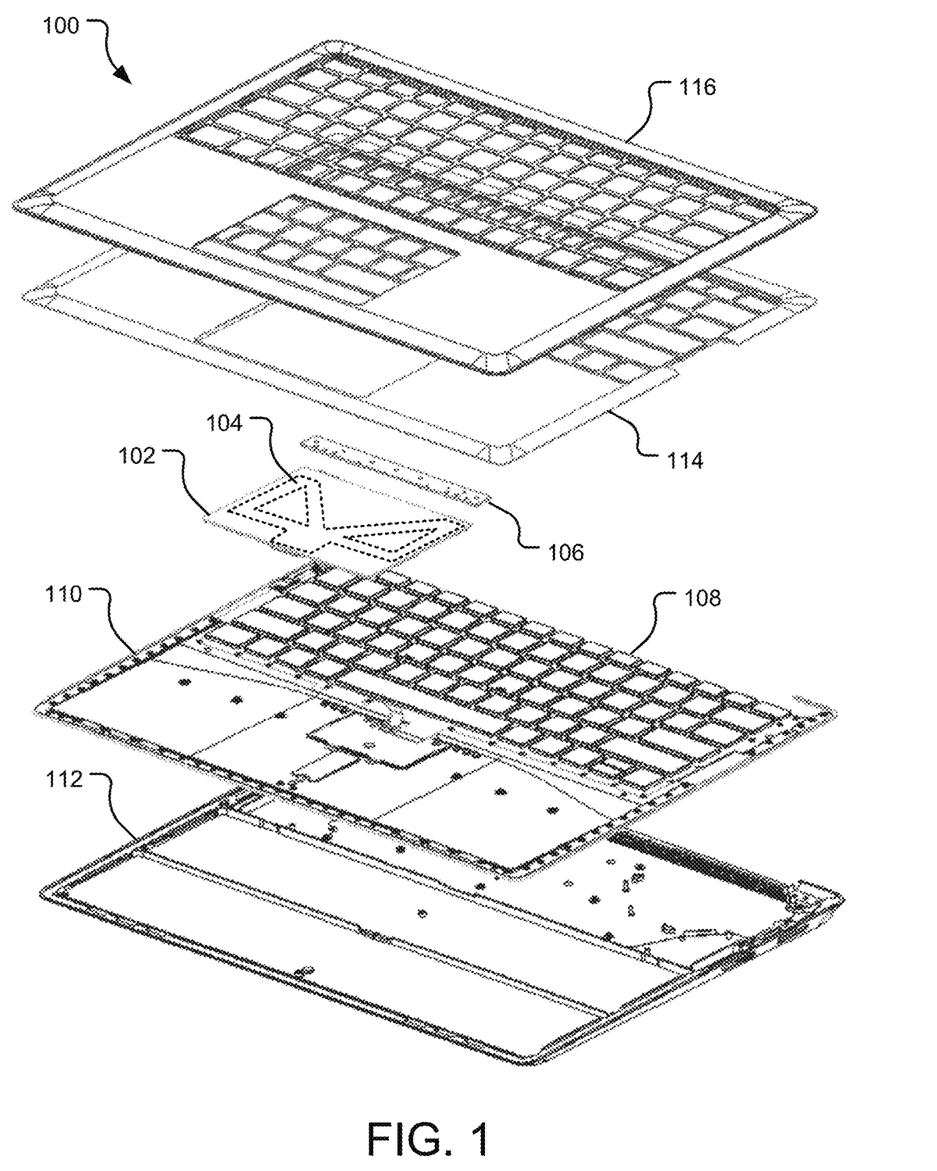
FIG. 1 illustrates an exploded perspective view of a keyboard assembly incorporating a rigidly bonded trackpad with a structural stiffener.

FIG. 1 illustrates an exploded perspective view of a keyboard assembly 100 incorporating a rigidly bonded trackpad 102 with a structural stiffener 104 (shown in dotted lines as it is hidden from view). The trackpad 102, a trackpad insertion stiffener 106, and a keyset 108 (an array of keys arranged in a predetermined pattern (e.g., QWERTY)) are each attached to a battery shield (or middle chassis) 110, which is in turn secured to a bottom chassis 112. The battery shield 110 provides a physical, thermal, and/or radio-frequency (RF) barrier between a battery (not shown) or other components mounted directly to the bottom chassis 112 and the trackpad 102 and/or the keyset 108. The trackpad insertion stiffener 106 is hingedly attached to the trackpad 102 and stiffens a strip of top chassis 114.

The top chassis 114 is the primary mounting structure for various components of the keyboard assembly 100, while the bottom chassis 112 forms a structural backbone and is the primary mounting structure for various other components of the keyboard assembly 100. The top chassis 114 is covered with a fabric covering 116 and attached to the bottom chassis 112 thereby enclosing and further securing the various components of the keyboard assembly 100 (e.g., the trackpad 102, the trackpad insertion stiffener 106, the battery shield 110, and the keyset 108) therein.

The fabric covering 116 may further seal the interior of the keyboard assembly 100 from contaminates and hides seams between the various components of the keyboard assembly 100. In some implementations, the fabric covering 116 is laminated with a partial sheet(s) of fabric on the battery shield 110 and/or the bottom chassis 112. In other implementations, two sheets of fabric are oriented on each side of the keyboard assembly 100 and are laminated together to form a fabric covering over both the top chassis 114 and the bottom chassis 112. The fabric covering 116 may include one or more windows that expose the keyset 108 and the trackpad 102 to a user. The fabric covering 116 may also integrate a touch-sensing capability that can digitize the user's physical interaction with the fabric covering 116, thus functions of the keyset 108 and/or the trackpad 102 may pass through the fabric covering 116 and the aforementioned windows may be omitted. The fabric covering 116 may further offer a desirable tactile experience for the user.

In various implementations, the keyboard assembly 100 may omit some of the features depicted in FIG. 1. For example, one or more of the insertion stiffener 106, the keyset 108, the battery shield 110, and the fabric covering 116 may be omitted in various implementations. The keyboard assembly 100 may also include additional features not depicted in FIG. 1. For example, the keyboard assembly 100 may include a display (conventional or touchscreen), as well as computing, antennae, power, electronic storage, or other electronic components.

Still further, the keyboard assembly 100 works in conjunction with an associated computing device (not shown). The computing device may be a tablet computer, laptop computer, personal computer, gaming device, smart phone, or any other device that carries out one or more specific sets of arithmetic and/or logical operations. In various instances, the keyboard assembly 100 is permanently attached to, selectively removable from, or physically separate from a remainder of the computing device.

The structural stiffener 104, amongst other stiffening features (e.g., structural adhesives, structural PCB substrates, and structural shield assemblies, not shown) alone or in combination permit the trackpad 102 to maintain minimum overall stiffness, weight, and cost requirements, while also permitting a decrease in trackpad assembly thickness as compared to conventional trackpad assemblies.

Figure 2:
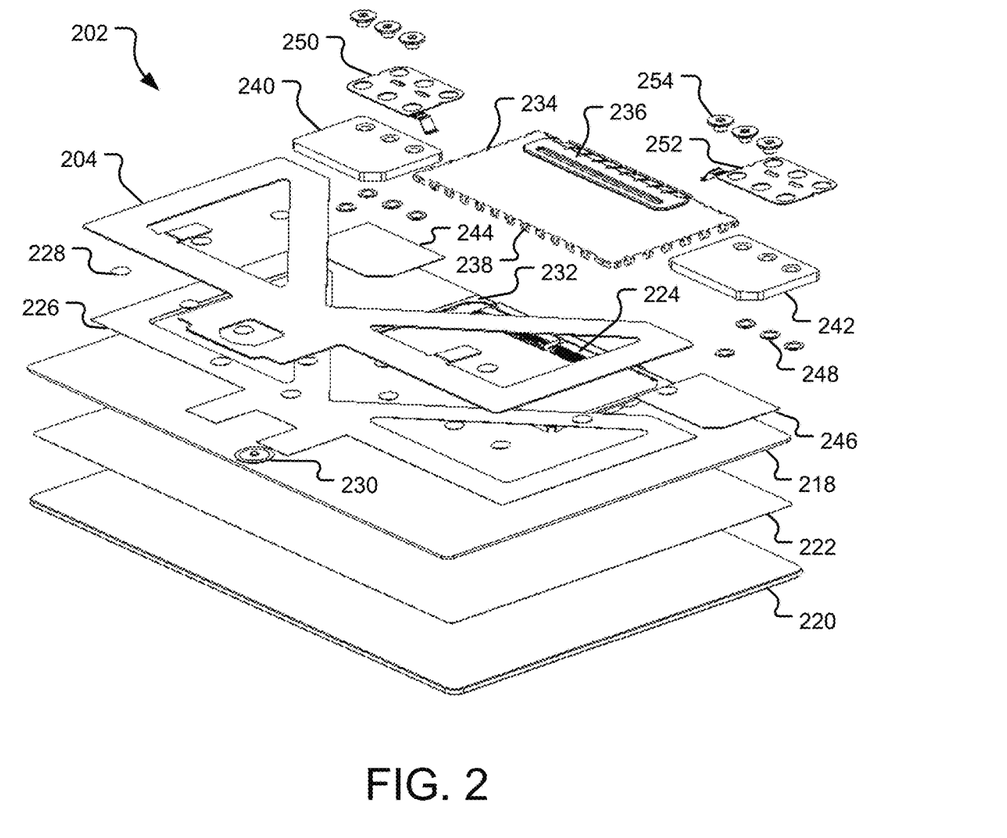
FIG. 2 illustrates an exploded perspective view of a rigidly bonded trackpad with a structural stiffener.

FIG. 2 illustrates an exploded perspective view of a rigidly bonded trackpad 202 with a structural stiffener 204. The trackpad 202 may be capacitive or resistive, incorporate a conductive matrix or a capacitive shunt, for example, and/or may use any available trackpad technology. The trackpad 202 includes a printed circuit board (PCB) 218 bonded to a glass or plastic user interface layer (or touch-sensitive surface) 220 with a heat-activated film (HAF) 222 therebetween.

The HAF 222 is placed between the PCB 218 and the user interface layer 220 and a combination of heat and pressure is applied to the HAF 222, the PCB 218, and the user interface layer 220. Once the HAF 222 reaches its critical temperature, it cross-links and rigidly bonds the PCB 218 to the user interface layer 220. In various implementations, the HAF 222 may include one or more of polyurethane, nitrile rubber, and phenolic resin. Further, in various implementations, the HAF 222 may be between 0.02-0.1 mm thick, or approximately 0.05 mm thick and have a cured elastic modulus of 100-150 MPa (or approximately 130 MPa). Still further, the user interface layer 220 may be 0.8-1.2 mm thick (or approximately 1.0 mm) thick.

The rigid bond between the PCB 218 and the user interface layer 220 created by the HAF 222 is distinct from a typical pressure-sensitive adhesive bond between a PCB and a user interface layer in a conventional trackpad. Pressure-sensitive adhesive does not rigidly cure and retains some flexibility throughout the life of a conventional trackpad. As a result, under various loads (particularly shear), the PCB 218 may slightly shift with respect to the user interface layer 220, which undermines structural rigidity of the assembled conventional trackpad. Further, as the pressure-sensitive adhesive does not rigidly cure, it does not contribute itself to the rigidity of the conventional trackpad. In some implementations, the HAF 222 includes areas of pressure-sensitive adhesive to aid in alignment of the PCB 218 and the user interface layer 220.

The PCB 218 includes an array of electronic components (not shown) placed within an area of the PCB 218 bounded by a shield wall 232. The electronic components control operation of the trackpad 202, and in some implementations other components of an associated computing device (not shown). The PCB 218 further includes component connectors (e.g., connector 224) that electrically connect the PCB 218 to the other components of the computing device. The shield lid 234 includes a corresponding emboss and flange fingers 236 that accommodate the component connectors and corresponding flexible printed circuits (FPCs) connected thereto, as well as electrically grounding the shield wall 232, the shield lid 234, and the FPCs to the PCB 218. The shield lid 234 overlays the shield wall 232 and each of an array of stanchions or castellations (e.g., stanchion 238) extending from the shield lid 234 are friction fit, soldered, or otherwise attached to the PCB 218 and/or the shield wall 232.

The resulting shield assembly (shield wall 232 and the shield lid 234, in combination with the PCB 218) provides RF shielding for the electronic components within the area of the PCB 218 bounded by the shield wall 232. Further, the shield assembly is rigidly attached to the PCB 218 and aids in improving overall rigidity of the trackpad 202. In various implementations, the shield wall 232 and shield lid 234 are made of a variety of metallic materials (e.g., stainless steel or other metal alloys of aluminum, copper, chromium, iron, magnesium, nickel, titanium, and/or zinc. In an example implementation, the shield wall 232 and the shield lid 234 are each a nickel/silver alloy and stainless steel, respectively. The shield wall 232 may be 1.0 mm tall and 0.2 mm thick, while the shield lid 234 may be 0.1 mm thick.

The structural stiffener 204 is bonded to the PCB 218 with an epoxy 226. An array of spacers or standoffs (e.g., spacer 228) are arranged between the structural stiffener 204 and the PCB 218 where they are to be attached together. The spacers may have a variety of quantity, shapes, sizes, and orientations between the PCB 218 and the structural stiffener 204. Further, the spacers may be made of a variety of materials, including but not limited to the metal alloys and plastics disclosed herein. In an example implementation, the spacers are freestanding pieces of Mylar secured in place by pressure-sensitive adhesive. In other implementations, the spacers extend integrally from the PCB 218 and/or the structural stiffener 204 prior to bonding.

The epoxy 226 is placed between the structural stiffener 204 and the PCB 218 and compressive pressure is applied to the structural stiffener 204, the PCB 218, and the epoxy 226. The applied pressure compresses the epoxy 226 to a point where the structural stiffener 204 and the PCB 218 are in contact with the spacers and any excess epoxy 226 is squeezed out the sides between the structural stiffener 204 and the PCB 218. In various implementations, the amount of excess epoxy 226 squeezed out the sides between the structural stiffener 204 and the PCB 218 is minimized. The compressive pressure is maintained as the epoxy 226 cross-links and cures. Once the epoxy 226 is cured, it rigidly bonds the structural stiffener 204 to the PCB 218.

In some implementations, heat is also applied to the structural stiffener 204 and/or the PCB 218 to aid or hasten the epoxy 226 curing. The rigid bond between the structural stiffener 204 and the PCB 218 created by the epoxy 226 is distinct from a typical pressure-sensitive adhesive bond, as described in detail above with regard to the HAF 222. The epoxy 226 thickness is defined by the spacer thickness and may range from 0.03-0.07 mm (or approximately 0.05 mm).

The structural stiffener 204 may also have a variety of shapes, sizes, and orientations with respect to the PCB 218 (see discussion below with regard to FIG. 3 for further detail). Further, the structural stiffener 204 may be made of a variety of materials (e.g., stainless steel or other metal alloys of aluminum, copper, chromium, iron, magnesium, nickel, titanium, and/or zinc). In an example implementation, the structural stiffener 204 is a 0.05-0.4 mm (or approximately 0.2 mm) thick piece of stainless steel that may weigh 2.0-4.0 g.

In other implementations, the structural stiffener 204 may be made of a rigid plastic or plastic composite (e.g., polyethylene, polyvinyl chloride (PVC), acrylonitrile butadiene styrene (ABS), polycarbonate (PC), PC/ABS, glass-filled polycarbonate, carbon fiber reinforced polymer (CFRP), and other fiber reinforced polymers). A plastic structural stiffener 204 may be used in implementations where nearby components of the computing device are particularly susceptible to electromagnetic interference. In an example implementation, the structural stiffener 204 is a 0.2-0.6 mm thick piece of ABS.

Attachment brackets 240, 242 are also bonded to the PCB 218 with epoxy 244, 246, respectively. Additional spacers or standoffs (e.g., spacer 248) are arranged between the attachment brackets 240, 242 and the PCB 218 where the attachment brackets 240, 242 are to be attached to the PCB 218. The epoxy 244, 246 is placed between the attachment brackets 240, 242 and the PCB 218, respectively, and compressive pressure is applied to the attachment brackets 240, 242, the PCB 218, and the epoxy layers 244, 246. The applied pressure compresses the epoxy 244, 246 to a point where the attachment brackets 240, 242 and the PCB 218 are in contact with the spacers and any excess epoxy 244, 246 is squeezed out the sides between the attachment brackets 240, 242 and the PCB 218. The spacers also serve to prevent or reduce the epoxy 244, 246 from flowing into screw holes in the brackets 240, 242 The compressive pressure is maintained as the epoxy 244, 246 cross-links and cures. Once the epoxy 244, 246 is cured, it rigidly bonds the attachment brackets 240, 242 to the PCB 218.

In some implementations, heat is also applied to the attachment brackets 240, 242 and/or the PCB 218 to aid or hasten the epoxy 244, 246 curing. The rigid bond between the attachment brackets 240, 242 and the PCB 218 created by the epoxy 244, 246 is distinct from a typical pressure-sensitive adhesive bond, as described in detail above with regard to the HAF 222. The epoxy 244, 246 thickness is defined by the spacer thickness and may range from 0.05-0.15 mm. In various implementations, one or both of the aforementioned epoxy and the HAF, in addition to or in lieu of pressure-sensitive adhesive may be used to create any of the aforementioned rigid bonds between the user interface layer 220, the PCB 218, the structural stiffener 204, and the brackets 240, 242.

The attachment brackets 240, 242 are relatively thick metal alloy or plastic structures (e.g., 1-4 mm thick, or approximately 1.4 mm thick) that serve as attachment points for mounting live hinges 250, 252 to the trackpad 202. The live hinges 250, 252 are attached to the attachment brackets 240, 242, respectively, via screws (e.g., screw 254). The live hinges 250, 252 are also screwed to the computing device and permit the trackpad 202 to pivot about the live hinges 250, 252 when the user depresses the trackpad 202. A trackpad switch 230 (e.g., a metal dome switch) attached to the PCB 218 also permits the trackpad 202 to depress with reference to the computing device and provides the user tactile feedback (a snapping sensation) when the trackpad 202 is depressed.

An overall maximum trackpad 202 thickness is defined pursuant to product development specifications and the various component thicknesses of the trackpad 202 (e.g., the user interface layer 220, the HAF 222, the PCB 218, the epoxy 226, and the structural stiffener 204), each of which contribute to the overall trackpad 202 thicknesses. In various implementations, the assembled rigidly bonded trackpad 202 is less than approximately 2.00 mm thick (or approximately 1.49 mm thick excluding the structural stiffener 204, or approximately 1.74 mm including the structural stiffener 204 and epoxy 226 bonding the structural stiffener 204 to the PCB 218). The trackpad 202 may also meet a predetermined stiffness requirement to hold deflection of the trackpad 202 within an acceptable range in response to a variety of projected loads (e.g., point loads at a variety of locations of the exposed surface area of the trackpad 202). In an example implementation, the trackpad 202 alone may have a bending stiffness of 20-25 N/mm, or approximately 10 N/mm when the trackpad 202 is incorporated within a keyboard assembly.

Figure 3:
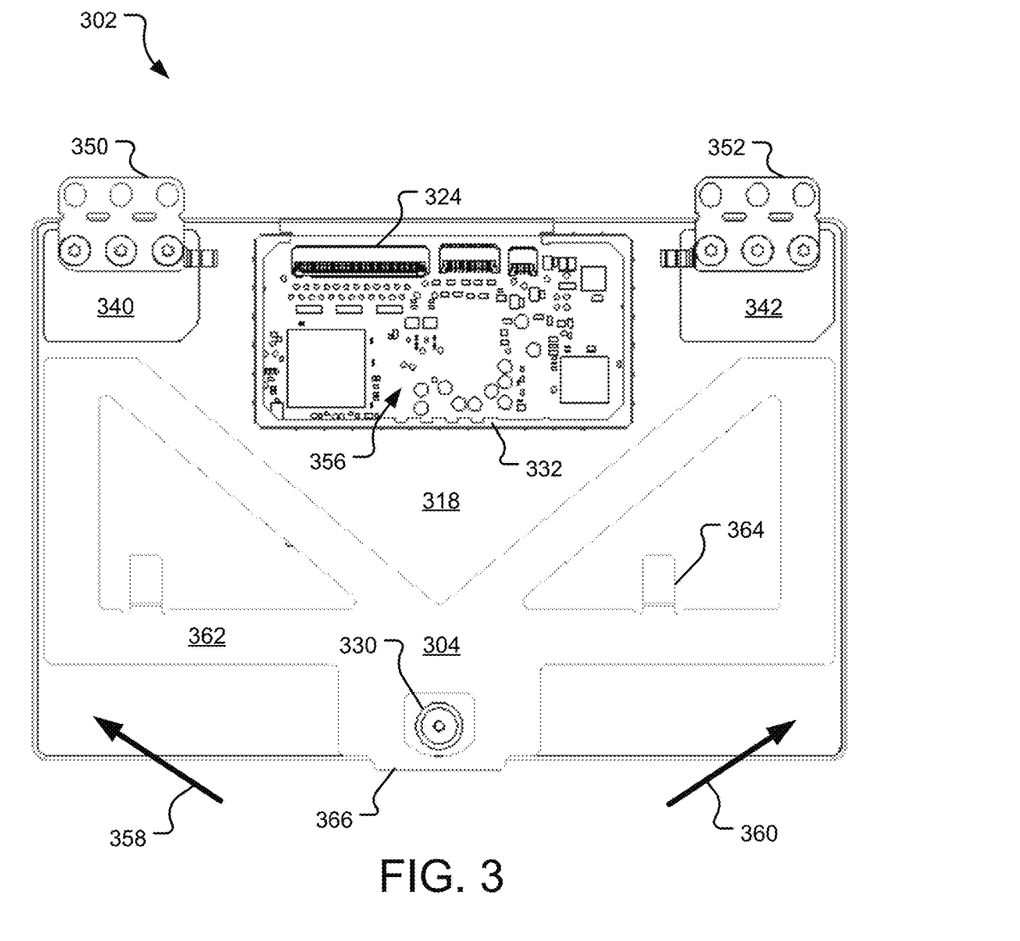
FIG. 3 illustrates a plan view of a rigidly bonded trackpad with a structural stiffener.

FIG. 3 illustrates a plan view of a rigidly bonded trackpad 302 with a structural stiffener 304. The trackpad 302 includes a PCB 318 rigidly bonded to a glass or plastic user interface layer (not shown) with a HAF (also not shown). The PCB 318 includes an array of electronic components 356 placed within an area of the PCB 318 bounded by a shield wall 332. The electronic components 356 control operation of the trackpad 302, and in some implementations other components of an associated computing device (not shown).

The PCB 318 further includes component connectors (e.g., connector 324) that electrically connect the PCB 318 to other components of the associated computing device. The shield lid (not shown) overlays the shield wall 332 and is attached to the PCB 318 and/or the shield wall 332. The resulting shield assembly (shield wall 332 and the shield lid, in combination with the PCB 318) encapsulates the electronic components 356, providing RF shielding for the electronic components 356, or RF shielding for other electronic components from RF emissions generated by the electronic components 356. Further, the shield assembly is rigidly attached to the PCB 318 and aids in improving overall rigidity of the trackpad 302.

The structural stiffener 304 and the attachment brackets 340, 342 are rigidly bonded to the PCB 318 with epoxy. Each of the structural stiffener 304 and the attachment brackets 340, 342 may also be grounded to the PCB 318 via grounding tabs (e.g., grounding tab 364). The attachment brackets 340, 342 serve as attachment points for screwing live hinges 350, 352 to the trackpad 302. The live hinges 350, 352 are also screwed to the computing device and permit the trackpad 302 to pivot about the live hinges 350, 352 when the user depresses the trackpad 302. A trackpad switch 330 (e.g., a metal dome switch) attached to the PCB 318 also permits the trackpad 302 to depress with reference to the computing device and provides the user tactile feedback when the trackpad 302 is depressed.

The structural stiffener 304 may have a variety of shapes, sizes, and orientations with respect to the PCB 318. As the trackpad 302 is hingedly attached to the computing device at live hinges 350, 352, and also has a point of contact with the computing device at the switch 330, the corners of the trackpad 302 opposite those occupied by the live hinges 350, 352 (illustrated by arrows 358, 360) are the furthest portions of the trackpad 302 from points of contact with the computing device. As a result, these corners are the most susceptible portions of the trackpad 302 to bottoming out within the computing device and failing to depress the switch 330 when the user depresses the trackpad 302 at these corners. The structural stiffener 304 is specifically designed to improve overall stiffness of the trackpad 302, but particularly in the corners opposite the live hinges 350, 352 to ensure the trackpad 302 is sufficiently rigid to avoid the aforementioned bottoming out within the computing device.

To that end, the structural stiffener 304 includes legs (e.g., leg 362 that generally connect between the live hinges 350, 352, the switch 330, and the corners of the trackpad 302 illustrated by the arrows 358, 360. Further, a majority of the structural stiffener 304 material is located within a half portion of the trackpad 302 distal from the live hinges 350, 352, which is more susceptible to bending loads than the half portion of the trackpad 302 proximate to the live hinges 350, 352. As a result, trackpad deformation when depressed by a user in the corners illustrated by the arrows 358, 360 (referred to herein as a corner click) is less than 0.2 mm (or approximately 0.08 mm).

Still further, the structural stiffener 304 includes a rebound stop 366 that provides a surface that catches a lip of the computing device, preventing the end of the trackpad 302 opposite the live hinges 350, 352 from protruding out of the computing device (e.g., after releasing the switch 330 or turning the computing device upside down).

In various implementations, one or both of the aforementioned epoxy and the HAF, in addition to or in lieu of pressure-sensitive adhesive may be used to create any of the aforementioned rigid bonds between the user interface layer, the PCB 318, the structural stiffener 304, and the brackets 340, 342. Various additional details of the trackpad 302 may be present as discussed above with reference to trackpad 202 of FIG. 2.

Figure 4:
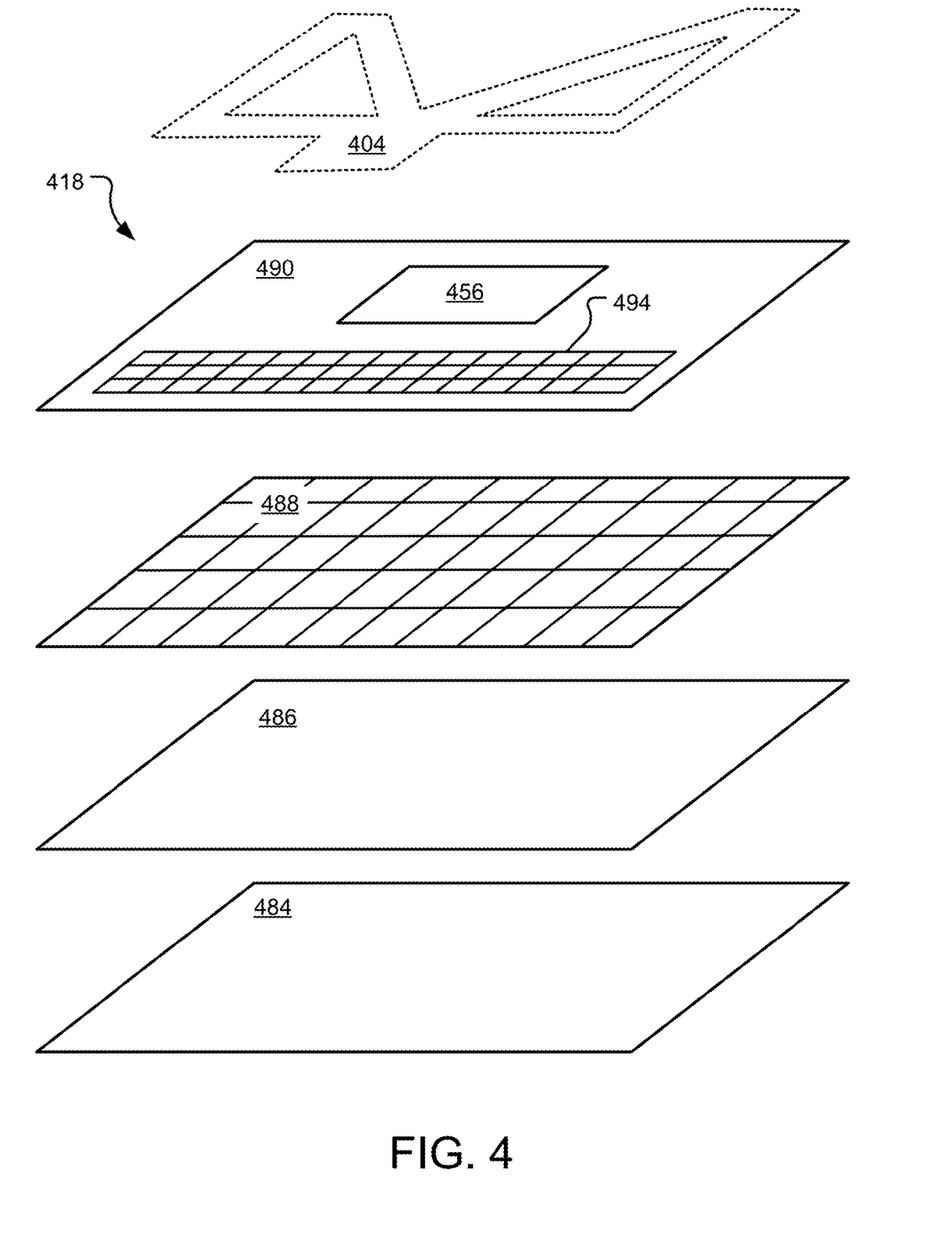
FIG. 4 illustrates an exploded perspective view of a four-layer printed circuit board and a structural stiffener for a rigidly bonded trackpad.

FIG. 4 illustrates an exploded perspective view of a four-layer printed circuit board 418 and a structural stiffener 404 for a rigidly bonded trackpad (not shown). The PCB 418 includes four distinct layers, a first layer 484, a second layer 486, a third layer 488, and a fourth layer 490. An array of electronic components 456 are placed within an area on a top surface of the fourth layer 490 of the PCB 418. The electronic components 456 control operation of the trackpad, and in some implementations other components of an associated computing device (also not shown). Also, a sensor pattern for the first layer 484 and the second layer 486 is not shown for clarity.

In an example implementation, the first layer 484 is a sensor pattern plane, the second layer 486 is a secondary sensor plane, the third layer 488 is a ground plane, and the fourth layers 490 is a component/trace plane that including grounding, which shields from stray RF fields. As a result, while the first and second layers 484, 486 require a small quantity of copper, the third and fourth layers 488, 490 require a larger quantity of copper. In various implementations, the small quantity of copper is defined as less than 30% surface area coverage, while the large quantity of copper is defined as greater than 40% surface area coverage. In a specific example implementation, the first and second layers 484, 486 incorporate less than 15% copper surface area coverage, while the third layer 488 incorporates more than 60% copper surface area coverage and the fourth layer 490 incorporates more than 40% copper surface area coverage.

During assembly, PCBs are often exposed to high temperatures (e.g., between 200 and 230 degrees C.) and subsequently cooled. Conventionally, conductive areas of PCB layers contain a solid metal foil. However, the presence of disparate quantities and locations of the solid metal foil within the PCB layers may yield differing effective coefficients of thermal expansion, which in turn can cause conventional PCBs to warp during cooling.

In an effort to control warping, some or all of the conductive areas of the PCB layers 484, 486, 488, 490 contain a metal mesh in lieu of the solid metal foil. More specifically, PCB layer 488 is completely covered by wide mesh (e.g., approximately 0.6 mm mesh) and the PCB layer 490 includes an area of narrow mesh 494 (e.g., approximately 0.3 mm mesh). In an example implementation, for shielding purposes, solid metal foil is included in areas of one or more of the PCB layers 484, 486, 488, 490 under inductors or other particularly sensitive electronic components, while narrow mesh is included in areas under trackpad traces, and wide mesh is included in all other conductive areas.

While the metal mesh may not offer equivalent electrical and/or shielding performance to solid metal foil, the metal mesh is more resistant to PCB warpage and may have sufficient electrical and/or shielding performance in certain areas of the PCB layers 484, 486, 488, 490. The metal mesh may be copper, gold, silver, aluminum, or various alloys thereof. The PCB 418 substrate may be a glass-reinforced epoxy laminate and may comply with the FR4 grade designation. In an example implementation, the PCB 418 substrate may be EM-370D in an effort to improve rigidity of the PCB 418. For example, the PCB 418 may have a modulus of elasticity (in-plane) of 15-30 GPa (or approximately 19 GPa).

The structural stiffener 404 is rigidly bonded to the fourth layer 490 of the PCB 418 (not shown). The structural stiffener 404 may have a variety of shapes, sizes, and orientations with respect to the PCB 418, as discussed in detail with regard to FIGS. 2 and 3 above, for example. In various implementations, one or more of an epoxy, HAF, and pressure-sensitive adhesive may be used to create the rigid bond between the fourth layer 490 of the PCB 418 and the structural stiffener 404. Various additional details of the PCB 418 may be present as discussed above with reference to PCB 218 of FIG. 2.

Figure 5:
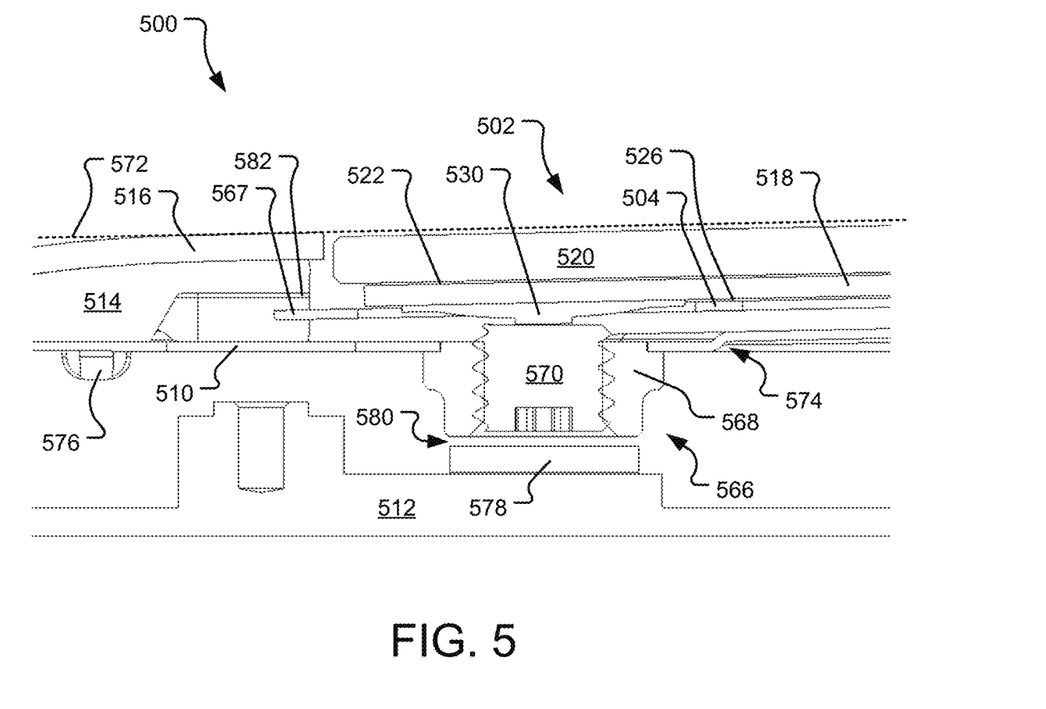
FIG. 5 illustrates a partial elevation sectional view of a rigidly bonded trackpad with a structural stiffener.

FIG. 5 illustrates a partial elevation sectional view of a rigidly bonded trackpad 502 with a structural stiffener 504. The trackpad 502 includes a PCB 518 rigidly bonded to a glass or plastic user interface layer 520 with a HAF 522. The structural stiffener 504 is rigidly bonded to the PCB 518 with an epoxy 526. Live hinges (not shown) pivotally attach the trackpad 502 to computing device 500. A trackpad switch 530 (e.g., a metal dome switch) attached to the PCB 518 permits the trackpad 502 to depress with reference to the computing device 500 and provides a user tactile feedback when the trackpad 502 is depressed. The structural stiffener 504 includes a rebound stop 567 that provides a surface that catches lip 582 of the computing device 500, preventing the end of the trackpad 502 opposite the live hinges from protruding out of the computing device 500 (e.g., after releasing the switch 530 or turning the computing device 500 upside down).

Bottom chassis 512 forms a structural backbone and primary mounting structure for various components (e.g., the trackpad 502) of the computing device 500. Top chassis 514 is the primary mounting structure for various other components of the computing device 500 and is attached to the bottom chassis 512 thereby enclosing and securing the various components of the computing device 500 therein. The top chassis 514 is covered with a fabric covering 516. A middle chassis 510 (e.g., a battery shield) lies between the bottom chassis 512 and the top chassis 514 and serves as a mounting surface for a trackpad height adjustment assembly 566.

The trackpad height adjustment assembly 566 includes a threaded nut 568 welded, pressed, or otherwise fixedly attached to the middle chassis 510. A set screw 570 screws into the nut 568 and presses upward against the switch 530 in order to set a resting height of the trackpad 502 approximately level with the fabric covering 516, as illustrated by dotted line 572. In various implementations, approximately level is defined as less than 0.3 mm variation in height (or approximately 0.2 mm variation in height).

When a user depresses the trackpad 502, the switch 530 presses against the set screw 570 until a critical force is applied and the switch 530 collapses, thereby indicating a user-selection using the trackpad 502. In some implementations, the middle chassis 510 may not be entirely rigid and may unintentionally substantially deflect when the user depresses the trackpad 502. Deflection of the middle chassis 510 may prevent the switch 530 from collapsing prior to the trackpad 502 bottoming out against one or more internal surfaces within the computing device 500, which may negatively affect the user experience by increasing force required to achieve a user-selection and/or creating a less responsive feel through the increased user-selection travel distance.

Embossing 574 or other stiffening features may be added to the middle chassis 510 in an effort to increase rigidity and reduce or prevent deflection of the middle chassis 510. Further, the middle chassis 510 may be heat staked (e.g., heat stake 576) or otherwise rigidly attached (e.g., glued, welded, screwed, and riveted) to the bottom chassis 512 and/or the top chassis 514 to increase rigidity and reduce or prevent deflection of the middle chassis 510. In various implementations, the embossing and/or additional attachment points may form a perimeter around the switch 530 to increase rigidity and reduce or prevent deflection of the middle chassis 510, particularly in the area around the switch 530.

To the extent that the middle chassis 510 continues to deflect in response to user-depression of the trackpad 502, a resilient stop 578 (e.g., rubber, foam, or soft plastic) is placed on the bottom chassis 512 below the set screw 570. A clearance 580 is provided between the set screw 570 and the resilient stop 578. In various implementations, clearance 580 is defined as approximately 0.2 mm. In normal operation, the set screw 570 does not contact the resilient stop 578 and any deflection of the middle chassis 510 occurs within the clearance 580. However, some particularly firm user-depressions of the trackpad 502 may cause the clearance 580 to close and the set screw 570 to contact the resilient stop 578. The resilient stop 578 absorbs the contact and dampens any noise caused by the contact or any reverberations against the resilient stop 578.

An operating gap is defined herein as a distance that the trackpad 502 may travel when depressed by a user at any point on an exposed surface area of the trackpad 502 and still trigger the switch 530 without bottoming out the trackpad 502 at any point within the computing device 500. In various implementations, the trackpad 502 fully operates within an operating gap of less than 0.75 mm (or approximately 0.5 mm). In one example implementation, the switch 530 deflects approximately 0.2 mm when collapsed and the trackpad 502 deflects up to approximately 0.1 mm under load. As a result, at least 0.3 mm clearance is provided between the trackpad 502 and the computing device 500 to accommodate both the switch 530 collapse and the trackpad 502 deflection.

Figure 6:
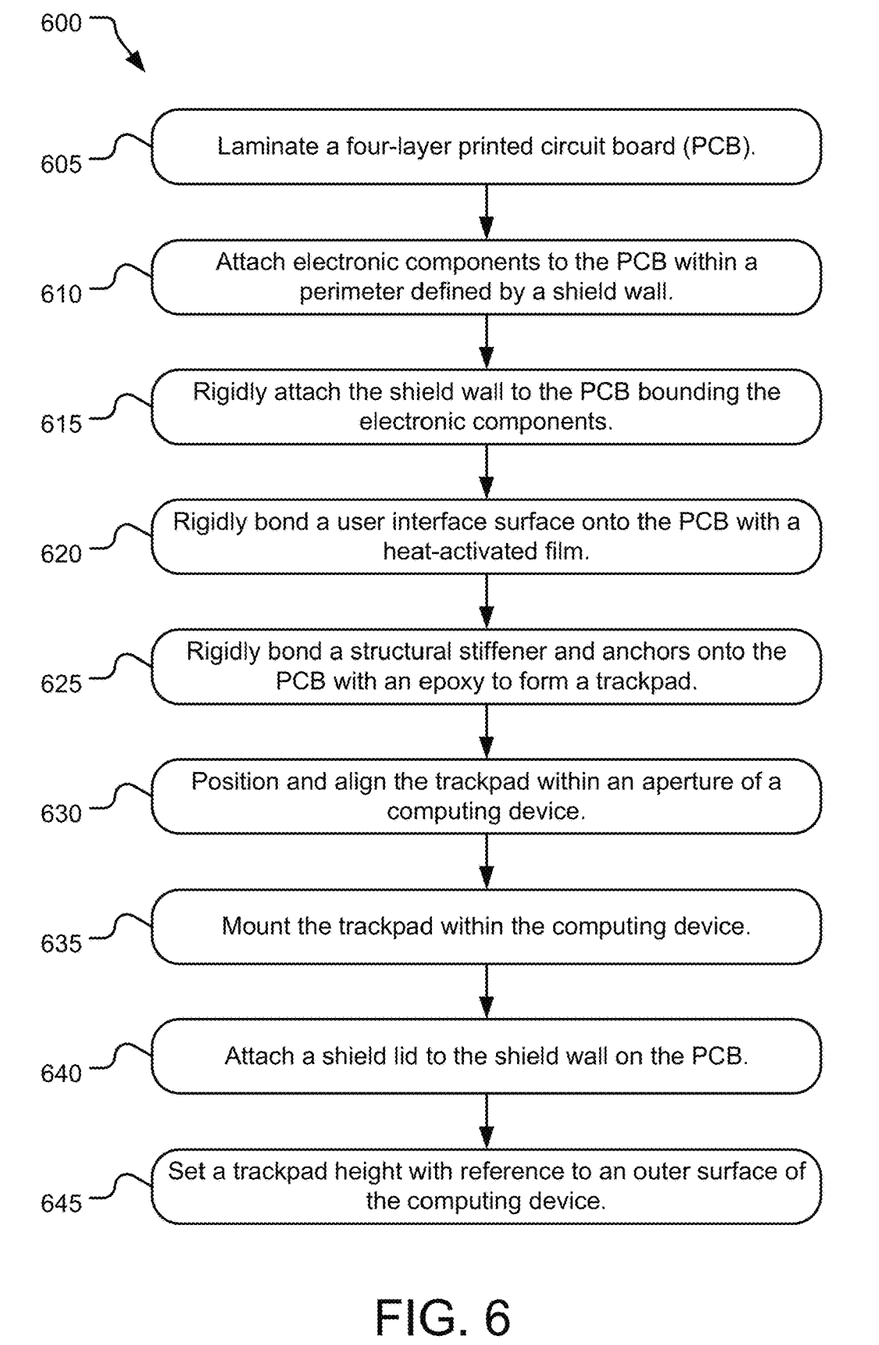
FIG. 6 illustrates example operations for manufacturing a rigidly bonded trackpad with a structural stiffener.

FIG. 6 illustrates example operations 600 for manufacturing a rigidly bonded trackpad with a structural stiffener. A laminating operation 605 laminates a four-layer PCB made of four FR-4 epoxy resin layers. One or more of the FR-4 epoxy resin layers may incorporate metallic mesh conductive areas in additional to or in lieu of solid metal foil conductive areas. The choice of metallic mesh or metal foil, as well as the mesh spacing may be driven by electrical requirements (conductivity and/or shielding) within each layer and vertically through the PCB. Heat and pressure are applied to the FR-4 epoxy resin layers, as well as an epoxy that is cured during the laminating operation 605. The result is a thin and structurally stiff PCB that meets all electrical requirements for the trackpad.

A first attaching operation 610 attaches the electronic components to the PCB within a perimeter defined by a shield wall. The electronic components control operation of the trackpad, and in some implementations other components of an associated computing device. A second attaching operation 615 rigidly attaches the shield wall to the PCB bounding the electronic components. The shield wall surrounds the electronic components and shields the electronic components from external RF interference, or external electronic components from RF interference generated by the electronic components mounted within the perimeter defined by the shield wall. The shield wall may be soldered continuously or periodically to the PCB forming a solid or intermittent filet bond that rigidly connects the shield wall to the PCB. As a result, the shield wall contributes to structural stiffness of the PCB.

A first bonding operation 620 rigidly bonds a user interface surface onto the PCB with a HAF. To perform the first bonding operation 620, the PCB and the user interface surface are assembled within a fixture with the HAF therebetween. The fixture maintains alignment between the PCB and the user interface surface and applies a desired quantity of heat and pressure at points on the PCB around the electronic components sufficient to cross-link and cure the HAF. As the PCB contains soldered connections, the applied heat is chosen such that the temperature of the PCB and the user interface surface meets or exceeds a temperature required to cure the HAF within a desired time period, but is insufficient to reflow previously soldered connections on the PCB. For example, the PCB/user interface surface is cured at 80-110 degrees C. under 130-170 kg-f applied for 20-60 seconds to achieve an approximately 100 degree C. bond line. As a result, the PCB and the user interface surface are rigidly bonded together such that the overall stiffness of the bonded structure exceeds the stiffness of the PCB and the user interface surface alone.

A second bonding operation 625 rigidly bonds a structural stiffener and attached brackets onto the PCB with an epoxy to form the trackpad. The structural stiffener may be formed using any available manufacturing technique, including but not limited to cutting, burning, stamping, machining, casting, and welding. To perform the second bonding operation 625, the PCB and the structural stiffener are assembled within a fixture with the epoxy therebetween. The fixture maintains alignment between the PCB and the structural stiffener and applies a desired quantity of pressure, and in some implementations, heat, sufficient to cross-link and cure the epoxy at points on the PCB around the electronic components. As the PCB contains soldered connections, the applied heat is chosen such that the temperature of the PCB and the user interface surface meets or exceeds a temperature required to cure the epoxy within a desired time period, but is insufficient to reflow previously soldered connections on the PCB. For example, the PCB/structural stiffener is cured at 80-110 degrees C. under 10 psi, or less, applied for 20-60 seconds to achieve an approximately 100 degree C. bond line. In some implementations, the curing schedule is sufficient to achieve an approximately 80% cure and prevent the PCB from shifting with respect to the structural stiffener. The remaining 20% cure is achieved by allowing the assembly to sit for an extended period of time (e.g., 24 hours). As a result, the PCB and the structural stiffener are rigidly bonded together such that the overall stiffness of the bonded structure exceeds the stiffness of each of the PCB, the user interface surface, and the structural stiffener alone.

A positioning operation 630 positions and aligns the trackpad within an aperture of the computing device. A mounting operation 635 mounts the trackpad within the computing device. In some implementations, the trackpad includes live hinges that connect one side of the trackpad to the computing device. The opposite side of the trackpad includes a switch that rests against an internal surface of the computing device and depresses when a user depresses the trackpad.

A third attaching operation 640 attaches a shield lid to the shield wall on the PCB. The shield lid and the shield wall, in combination with the PCB form a shield assembly that encompasses the aforementioned electronic components mounted on the PCB within the perimeter established by the shield wall. In various implementations, the shield lid is friction-fit, adhered, crimped, soldered, or otherwise attached to the shield wall and/or the PCB.

A setting operation 645 sets trackpad height with reference to an outer surface of the computing device. In various implementations, a set screw sets the trackpad height to be substantially coplanar with a top surface of the computing device. A resilient stop is placed below the set screw within the computing device to absorb one or both of contact between the set screw and the chassis and reverberations therebetween.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

In various implementations, the dimensions provided herein are approximate and defined as +/−10%. In other implementations, the provided dimensions may have proportionally greater values than that specifically defined. Further, other dimensions than those specifically provided are contemplated herein.

An example trackpad according to the presently disclosed technology includes a printed circuit board, a user interface layer bonded to a first side of the printed circuit board with a structural adhesive therebetween, and a structural stiffener bonded to a second side of the printed circuit board with another structural adhesive therebetween.

In another example trackpad according to the presently disclosed technology, the structural adhesives include one or both of a heat-activated film and an epoxy.

In another example trackpad according to the presently disclosed technology, the structural adhesives are rigid when cured.

In another example trackpad according to the presently disclosed technology, the structural stiffener is a metallic alloy and the user interface layer is glass.

In another example trackpad according to the presently disclosed technology, the printed circuit board is a four-layer printed circuit board.

In another example trackpad according to the presently disclosed technology, the printed circuit board includes a conductive mesh within one or both of third and fourth layers of the printed circuit board.

In another example trackpad according to the presently disclosed technology, the printed circuit board has a EM-370D epoxy resin substrate.

Another example trackpad according to the presently disclosed technology further includes a shield assembly rigidly attached to the printed circuit board and encapsulating one or more electronic components of the printed circuit board.

In another example trackpad according to the presently disclosed technology, the shield assembly includes a shield wall rigidly attached to the printed circuit board and a shield lid rigidly attached to one or both of the shield wall and the printed circuit board.

Another example trackpad according to the presently disclosed technology further includes a metal dome switch bonded to the second side of the printed circuit board.

In another example trackpad according to the presently disclosed technology, the trackpad has a bending stiffness of 20-22 N/mm.

In another example trackpad according to the presently disclosed technology, the trackpad is less than 2.0 mm thick.

An example method of manufacturing a trackpad according to the presently disclosed technology includes rigidly bonding a user interface layer to a first side of a printed circuit board using a structural adhesive, and rigidly bonding a structural stiffener to a second side of the printed circuit board using another structural adhesive.

In another example method of manufacturing a trackpad according to the presently disclosed technology, the structural adhesives include one or both of a heat-activated film and an epoxy.

In another example method of manufacturing a trackpad according to the presently disclosed technology, the rigidly bonding operations include applying both of heat and pressure to the trackpad.

Another example method of manufacturing a trackpad according to the presently disclosed technology further includes laminating four FR-4 epoxy resin layers together to form the printed circuit board.

Another example method of manufacturing a trackpad according to the presently disclosed technology further includes rigidly attaching a shield assembly to the second side of the printed circuit board.

An example computing device according to the presently disclosed technology includes a trackpad and a chassis. The trackpad includes a printed circuit board, a user interface layer bonded to a first side of the printed circuit board with a structural adhesive therebetween, a structural stiffener bonded to a second side of the printed circuit board with another structural adhesive therebetween, and a trackpad switch. The chassis includes a trackpad height set screw pressing against the trackpad switch to set a resting height of the trackpad with reference to a top surface of the computing device, and a resilient stop oriented between the set screw and the chassis to absorb one or both of contact of the set screw with the chassis and reverberations therebetween.

In another example computing device according to the presently disclosed technology, the trackpad switch is a metal dome switch.

In another example computing device according to the presently disclosed technology, the trackpad is less than 2.0 mm thick.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A trackpad comprising:
   a printed circuit board;
   a user interface layer bonded to a first side of the printed circuit board with a structural adhesive therebetween;
   a structural stiffener bonded to a second side of the printed circuit board with another structural adhesive therebetween; and
   two or more attachment brackets also bonded to the second side of the printed circuit board.

2. The trackpad of claim 1, wherein the structural adhesive includes one or both of a heat-activated film and an epoxy.

3. The trackpad of claim 1, wherein the structural adhesives are rigid when cured.

4. The trackpad of claim 1, wherein the structural stiffener is a metallic alloy and the user interface layer is glass.

5. The trackpad of claim 1, wherein the printed circuit board is a four-layer printed circuit board.

6. The trackpad of claim 5, wherein the printed circuit board includes a conductive mesh within one or both of third and fourth layers of the printed circuit board.

7. The trackpad of claim 1, wherein the printed circuit board has an EM-370D epoxy resin substrate.

8. The trackpad of claim 1, further comprising:
   a shield assembly rigidly attached to the printed circuit board and encapsulating one or more electronic components of the printed circuit board.

9. The trackpad of claim 8, wherein the shield assembly includes a shield wall rigidly attached to the printed circuit board and a shield lid rigidly attached to one or both of the shield wall and the printed circuit board.

10. The trackpad of claim 1, further comprising:
    a metal dome switch bonded to the second side of the printed circuit board.

11. The trackpad of claim 1, wherein the trackpad has one or both of a bending stiffness of 20-22 N/mm and a thickness less than 2.0 mm.

12. A method of manufacturing a trackpad comprising:
    rigidly bonding a user interface layer to a first side of a printed circuit board using a structural adhesive;
    rigidly bonding a structural stiffener to a second side of the printed circuit board using another structural adhesive; and
    attaching the second side of the printed circuit board to two or more live hinges using two or more attachment brackets.

13. The method of claim 12, wherein the structural adhesives include one or both of a heat-activated film and an epoxy.

14. The method of claim 12, wherein the rigidly bonding operations include applying both of heat and pressure to the trackpad.

15. The method of claim 12, further comprising:
    laminating four FR-4 epoxy resin layers together to form the printed circuit board.

16. The method of claim 12, further comprising:
    rigidly attaching a shield assembly to the second side of the printed circuit board.

17. A computing device comprising:
    a trackpad including:
       a printed circuit board;
       a user interface layer bonded to a first side of the printed circuit board with a structural adhesive therebetween;
       a structural stiffener bonded to a second side of the printed circuit board with another structural adhesive therebetween; and
       two or more attachment brackets also bonded to the second side of the printed circuit board;
    a trackpad switch;
    a chassis including:
       a trackpad height set screw pressing against the trackpad switch to set a resting height of the trackpad with reference to a top surface of the computing device; and
       a resilient stop oriented between the set screw and the chassis to absorb one or both of contact of the set screw with the chassis and reverberations therebetween.

18. The computing device of claim 17, wherein the trackpad switch is a metal dome switch.

19. The computing device of claim 17, wherein the trackpad has one or both of a bending stiffness of 20-22 N/mm and a thickness less than 2.0 mm.

20. The trackpad of claim 1, the structural stiffener including one or more legs, each of which generally extend between a corner of the user interface layer and an attachment bracket of the trackpad.

21. The method of claim 12, the structural stiffener including one or more legs, each of which generally extend between a corner of the user interface layer and an attachment bracket of the trackpad.

22. The computing device of claim 17, the structural stiffener including one or more legs, each of which generally extend between a corner of the user interface layer and an attachment bracket of the trackpad.

* * * * *